Sept. 13, 1960 E. WEISS ET AL 2,952,407

PARALLEL ADDER CIRCUIT

Filed June 26, 1953 4 Sheets-Sheet 1

Fig. 1

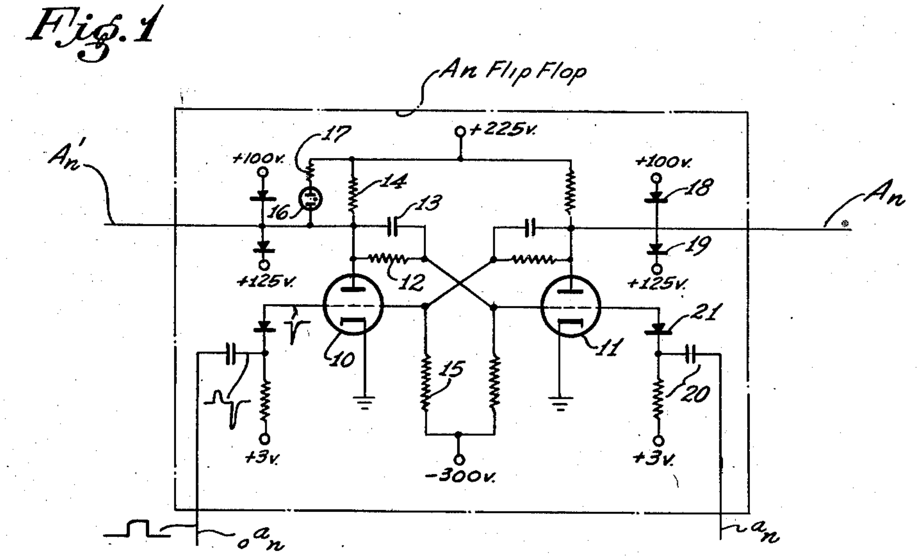

Fig. 5

TABLE I

| A2 | B2 | $D'_{1/2}$ | Sum | $D'_{2/3}$ | $a_2$ | $_0a_2$ |
|---|---|---|---|---|---|---|
| INPUTS | | | | "NO CARRY" | | |
| 0 | 0 | 0 | 0 | 1 | 0 | 0 |
| 0 | 0 | 1 | 1 | 1 | 1 | 0 |
| 0 | 1 | 0 | 1 | 1 | 1 | 0 |
| 0 | 1 | 1 | 0 | 0 | 0 | 0 |
| 1 | 0 | 0 | 1 | 1 | 0 | 0 |
| 1 | 0 | 1 | 0 | 0 | 0 | 1 |
| 1 | 1 | 0 | 0 | 0 | 0 | 1 |
| 1 | 1 | 1 | 1 | 0 | 0 | 0 |

$$a_2 = A_2'(B_2' D_{1/2} + B_2 D_{1/2}')C$$
$$_0a_2 = A_2(B_2' D_{1/2} + B_2 D_{1/2}')C$$
$$D_{2/3}' = A_2' D_{1/2}' + B_2' D_{1/2}' + A_2' B_2'$$

Fig. 6

TABLE II

| A3 | B3 | $D_{2/3}$ | Sum | $D_{3/4}$ | $a_3$ | $_0a_3$ |
|---|---|---|---|---|---|---|
| INPUTS | | | | "CARRY" | | |
| 0 | 0 | 0 | 0 | 0 | 0 | 0 |
| 0 | 0 | 1 | 1 | 0 | 1 | 0 |
| 0 | 1 | 0 | 1 | 0 | 1 | 0 |
| 0 | 1 | 1 | 0 | 1 | 0 | 0 |
| 1 | 0 | 0 | 1 | 0 | 0 | 0 |
| 1 | 0 | 1 | 0 | 1 | 0 | 1 |
| 1 | 1 | 0 | 0 | 1 | 0 | 1 |
| 1 | 1 | 1 | 1 | 1 | 0 | 0 |

$$a_3 = A_3'(B_3' D_{2/3} + B_3 D_{2/3}')C$$
$$_0a_3 = A_3(B_3' D_{2/3} + B_3 D_{2/3}')C$$
$$D_{3/4} = A_3 D_{2/3} + B_3 D_{2/3} + A_3 B_3$$

Fig. 7

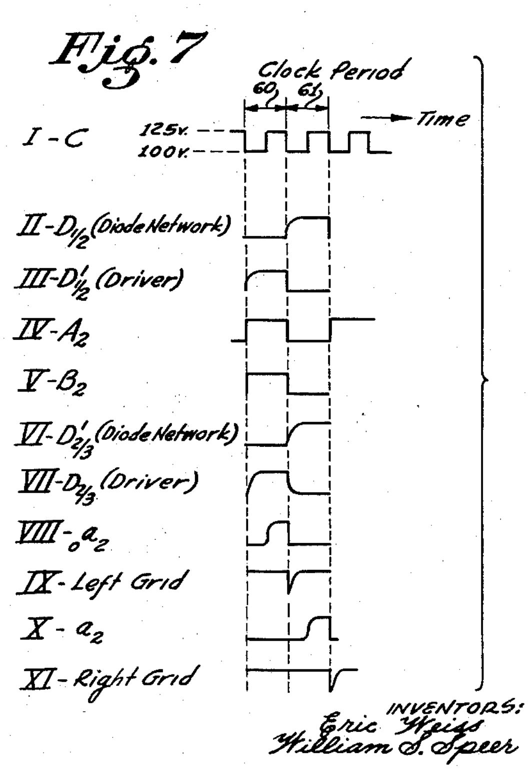

INVENTORS:
Eric Weiss
William S. Speer

By Mason, Mason & Sheridan
Patent Attorney

INVENTORS:
Eric Weiss
William S. Speer

By Mason, Mason & Sheridan
Patent Attorneys

Sept. 13, 1960 E. WEISS ET AL 2,952,407

PARALLEL ADDER CIRCUIT

Filed June 26, 1953 4 Sheets-Sheet 3

INVENTORS:
Eric Weiss
William S. Speer

Mason, Mason & Sheridan
Patent Attorneys

INVENTORS:
Eric Weiss
William S. Speer

By Mason, Mason & Sheridan
Patent Attorneys

United States Patent Office 2,952,407
Patented Sept. 13, 1960

2,952,407

PARALLEL ADDER CIRCUIT

Eric Weiss and William S. Speer, Los Angeles, Calif., assignors, by mesne assignments, to The National Cash Register Company, a corporation of Maryland Filed June 26, 1953, Ser. No. 364,442

9 Claims. (Cl. 235—175)

The invention relates to digital computing circuitry, and more particularly to an electronic parallel accumulator for binary numbers.

In designing circuitry for generating step-by-step logical processes for manipulating data wherein the data residing in flip-flop circuits during each step is a function of the previously generated data, the method in general is to generate flip-flop trigger signals during each step by means of logical circuits responsive to the states of the flip-flops as set-up during previous steps. These trigger signals are utilized to trigger the flip-flops at precisely the end of each step. The new status of the flip-flops then represents new information to which the logical circuitry responds to generate the flip-flop trigger signals for setting up data for the next step of the process.

In certain logical processes the circuitry can be simplified and the process speeded up if new information can be determined immediately by logical circuitry such that there is no need to set-up the new information in the flip-flop circuits prior to feeding it into the logical circuitry. Under these circumstances the logical circuitry must be so designed that its electrical transients are completed well within the first half of the basic timing period normally allotted for each step of the process. This is necessary to ensure that the logical circuitry will operate in a reliable manner.

The interstage carry information in parallel adding or accumulating circuits is of this type. In such circuitry the carry information derived from the first stage must be combined with the information in the second stage to determine the carry therefrom, and this carry information must in turn be combined with information in the third stage, and so on throughout the stages, in sequential order.

From this it can be seen that in order to be able to add a number into the accumulator by a single actuation of the circuitry, i.e., in one step, as proposed by the present invention, the logical circuitry provided for propagating this carry information throughout the accumulator must be extremely fast-acting since it is essential that all the interstage carry information be known before the trigger signals can be generated for setting up the binary number corresponding to the sum in the accumulator.

Among the objects of this invention is the provision of circuitry capable of adding an incoming binary number to the existing contents of an accumulator in response to a single actuating impulse.

Another object is the provision of a logical network capable of simply determining all the interstage carry information prior to the setting up of the new sum in an accumulator.

Still another object of this invention relates to a novel means for propagating the interstage carries so as to minimize delays due to transients.

Still another object of this invention is the provision of an accumulator circuit in which the stages are so designed that additional stages may be easily introduced into the circuitry to increase the capacity of the accumulator.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a schematic circuit diagram of the flip-flop circuit arrangement used for each binary stage of the accumulator.

Fig. 5 is a binary table used for explaining the arrangement of the logical circuitry for the even stages of the accumulator.

Fig. 6 is a binary table used for explaining the arrangement of the logical circuitry for the odd stages of the accumulator.

Fig. 7 shows the waveforms at various points of the circuitry associated with the second stage of the accumulator.

Figure 2:
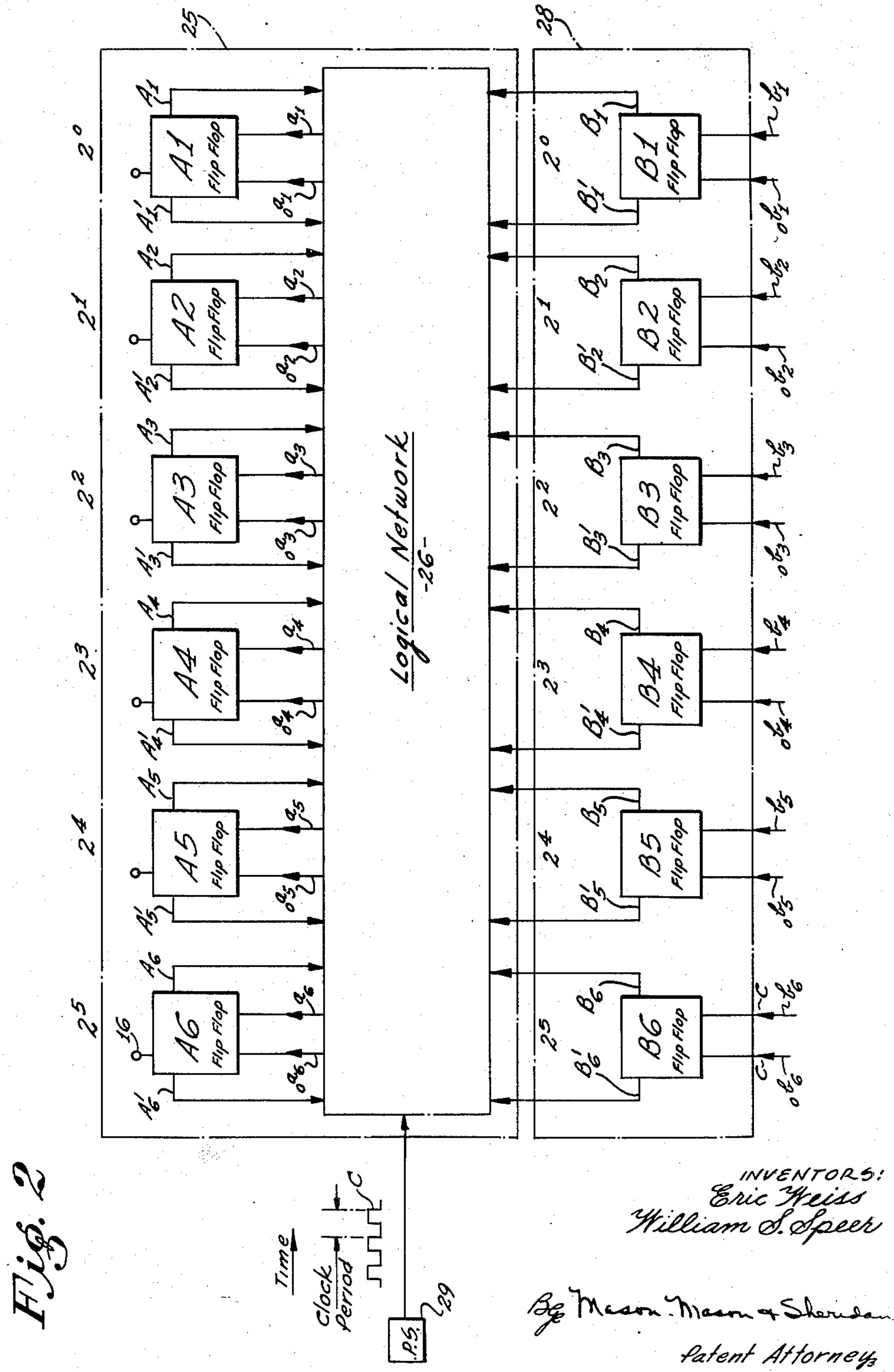
Fig. 2 is an overall block diagram showing the accumulator circuitry.

Referring to Fig. 1, a detailed schematic circuit diagram is shown of a conventional flip-flop circuit An adapted to operate in accordance with the scheme of the present invention. This circuit is comprised of a pair of triode tubes 10 and 11 wherein the plate of each is intercoupled to the grid of the other by an RC circuit as shown by resistor 12 shunted by capacitor 13 connecting the plate of tube 10 to the grid of tube 11. The plate circuit of each of the triodes is energized from a source of +225 v. which is connected to the anode of each tube through a separate plate resistor, like resistor 14. The cathode of each of the tubes is grounded. Each of the grids of the tubes is connected through a separate grid resistor, such as 15, to a negative bias −300 v. The circuit elements are chosen so that the circuit is capable of residing in either of two stable states, one of which is characterized by a high current flow through one of the tubes and the other by a high current flow through the opposite tube.

The flip-flop circuit is considered to be in a "one" state when the left tube 10 is conducting heavily. Under these conditions the neon light 16, connected in series with a limiting resistor 17 across the left plate resistor 14, lights up. When the flip-flop is in a "zero" state, the right tube 11 is conducting heavily and neon light 16 is extinguished.

The output lines from the An flip-flop, as taken from the plates of tubes 10 and 11, are designated $A_n$ and $A'_n$, respectively. In order to maintain the swing of the plate voltage between the voltage levels +125 v. and +100 v., clamping diodes, such as diodes 18 and 19 associated with the right output $A_n$, are provided on each of the output lines.

The right and left inputs of the circuits, designated as $a_n$ and ${}_0a_n$, respectively, are coupled to the grids of tubes 11 and 12, respectively, through respective differentiating circuits, such as 20, diode, such as 21, orientated to pass only negative pulses, as shown in particular for the circuitry connecting the right input $a_n$ to the grid of tube 11.

As will be noted in the ensuing description, all the flip-flop circuits of the invention are arranged similar to the An flip-flop and are therefore shown in block diagram form for simplification. Because the circuitry of the present invention can be most conveniently described by the use of logical equations, a standard nomenclature is employed for all the flip-flop circuits. This consists of using combinations of capital letters and numbers for designating the respective proposition flip-flop circuits. The outputs of the flip-flop circuits are then designated by corresponding capital letters with the number as a subscript. In order to characterize the true state of a proposition flip-flop circuit from its false state, the latter is distinguished from the former by an affixed prime.

As for the inputs to the flip-flop circuits, these are designated by corresponding lower case letters with the associated number as a subscript. The input which triggers a flip-flop circuit into a false state, that is, the left input as shown on the diagram of Fig. 1, is further characterized by a subscript zero prefixing the lower case letter.

Referring next to Fig. 2, the preferred embodiment of the binary accumulator 25 of the present invention is shown to be comprised of a series of flip-flop circuits A1 to A6, inclusive, corresponding to binary stages $2^0$ to $2^5$, respectively. The input and outputs of these flip-flop circuits are defined in the manner above described.

A logical network 26 is provided for determining the required changes to be made in the accumulator flip-flops A1 to A6 in order to perform the function of adding to its content a new binary number, as found in an input register 28 comprised of a similar group of flip-flop circuits B1 to B6, inclusive. These latter flip-flops likewise correspond to binary stages $2^0$ to $2^5$, respectively.

To simplify the present description, it will be assumed that the flip-flop circuits B1 to B6 of the input register 28 are subject to being triggered at the end of each basic timing period in response to signals received on their respective input terminals $b_1$, ${}_0b_1$; $b_2$, ${}_0b_2$; etc. from an external source, not shown.

During any particular basic timing period, the A flip-flops of the accumulator 25 are assumed to be storing a binary number and the logical network 26 functions to add the contents of the input register 28 to the contents of the accumulator 25 in a parallel fashion, i.e., all stages simultaneously. The operation of the circuits are all controlled and synchronized by a periodic square waveform generated by a timing pulse source 29. Each square wave is referred to as a clock pulse C; and, as shown, the time between the trailing edge of one clock pulse to the next is referred to as the basic timing period or clock period. As will be more clearly pointed out in the ensuing description, all the flip-flop circuits of the present circuitry respond to a negative pulse created by the fall of a clock pulse C. Thus flip-flop changes occur only precisely at the end of a clock period.

Figure 3:
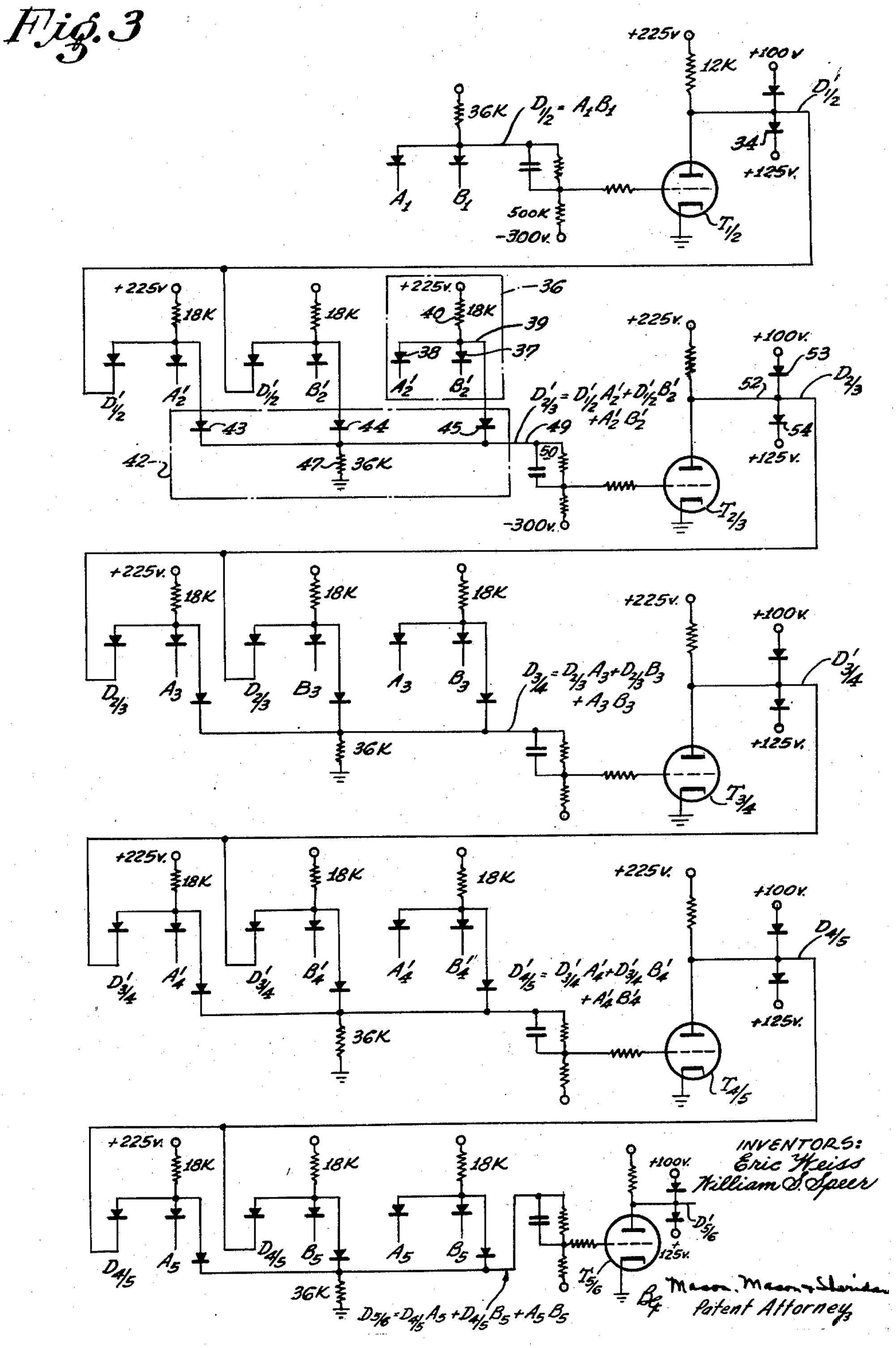
Fig. 3 is a schematic circuit diagram of the logical circuitry provided for propagating the interstage carry information.
Figure 4:
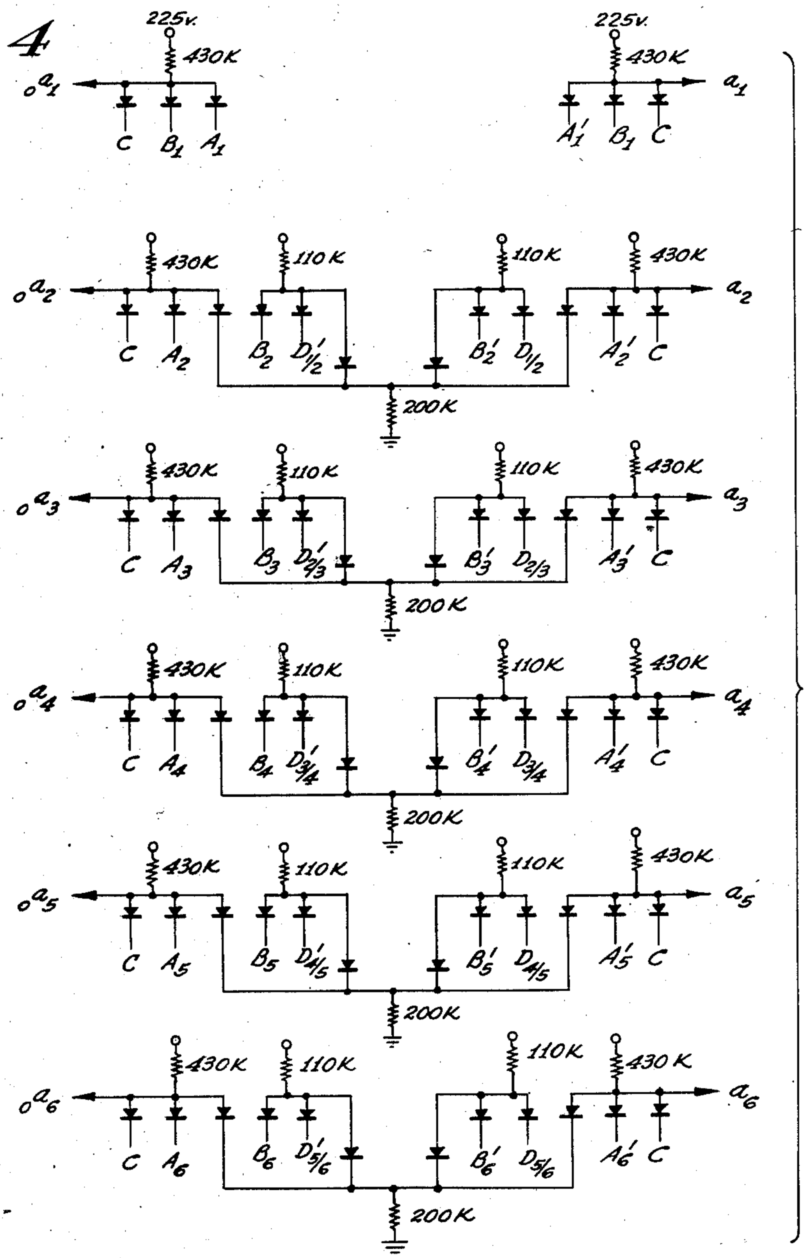
Fig. 4 is a schematic circuit diagram of the logical circuitry provided for triggering the accumulator flip-flop circuits.

During each clock period the logical network 26 settles in response to the signals indicative of the states of the B flip-flops of the input register 28 and the A flip-flops of the accumulator 25. By the use of these signals, the logical network 26 is capable of generating control potentials for effectively gating a clock pulse received during the latter half of the clock period into the inputs of the accumulator flip-flop circuits. The logical network 26 comprises carry diode networks, as shown in Fig. 3, and trigger diode networks, as shown in Fig. 4. The carry diode networks are operable, in response to lower order carry information and information residing in the flip-flop circuits, to determine the interstage carry information. The trigger diode networks respond to the information in the flip-flop circuits and also the carry information generated by the carry diode networks. In addition the trigger diode networks all respond to the clock pulses C. As a result, whenever conditions are such that a trigger diode network, connected to the input of a particular flip-flop circuit, is effective, a pulse similar to the clock pulse C is impressed on this input. The input circuitry then operates to differentiate the fall of the clock pulse to generate a negative pulse which triggers the flip-flop circuit to the state called for.

Referring next to Fig. 3, the carry diode network for generating the interstage carry information for the accumulator is shown. The present embodiment provides for generating by means of diode networks the "carry" information from the odd to even stages, and the "no carry" information from the even to odd stages. Thus note that output lines $D_{1/2}$, $D_{3/4}$, and $D_{5/6}$, which provide signals corersponding to "carry" information from the odd stage to the even stage indicated by their subscripts, are each defined by a logical equation which is generated by the diode network shown. Signals corresponding to "no carry" information from the odd to even stages are then obtained on output lines $D'_{1/2}$, $D'_{3/4}$, and $D'_{5/6}$ by inverting the signals on the $D_{1/2}$, $D_{3/4}$, and $D_{5/6}$ outputs by means of triode tubes $T_{1/2}$, $T_{3/4}$, and $T_{5/6}$, respectively. These tubes not only function to generate the logical inverse of the signals they receive, but also serve to drive the following logical circuitry responding to these signals.

On the other hand, the "no carry" signal information from the even to odd stages is defined by logical equations and generated on output lines $D'_{2/3}$ and $D'_{4/5}$ by diode networks, while signals corresponding to the "carry" information from the even to odd stages are derived on output lines $D_{2/3}$ and $D_{4/5}$ by inversion of these "no carry" signals in tubes $T_{2/3}$ and $T_{4/5}$, respectively.

It should be appreciated that each of these logical equations defines under what condition the "carry" or "no carry" information for a stage will be generated. The signals on the outputs of corresponding A and B stages, together with carry information from the previous stage, represent the terms of the equations which are combined by logical "and" or logical "or" operations which are indicated in equation form as logical products and logical sums, respectively.

As noted in Fig. 3, the portion of the diode network enclosed within block 36 is a typical logical "and," i.e., logical product diode network. In such a circuit, signals having voltage levels of either +100 or +125 are obtained from the source indicated and applied on the cathode-ends of crystal diodes, such as 37 and 38, whose anode-ends are joined to a common line 39 connected to a positive source +225 through a product resistor 40.

Any time all the diode input signals to product circuit 36 are at the high potential of +125 v., the output line 39 swings to this high potential. If any one of the input signals is at the low potential of +100 v., the output line 39 is at this low potential because of the current flow through resistor 40.

The output line 39 is connected to one of the inputs of a typical logical "or," i.e., logical sum network, enclosed within block 42. This logical sum network is comprised of three input diodes 43, 44, and 45 whose cathode-ends are joined and returned to ground through a sum resistor 47. The input signals to this circuit are applied on the anode-ends of the diodes. Whenever any of the inputs to logical sum network 42 is at the high potential of +125 v., the current flow through sum resistor 47 causes the output line 49 to swing to the high potential +125 v. indicative of a "no carry" into the third stage. This logical sum output 49 is connected to driver tube $T_{2/3}$ by way of an RC compensating network 50 which serves to square the waveform impressed onto the grid of driver tube $T_{2/3}$. The plate output 52 of tube $T_{2/3}$ is clamped between +100 v. and +125 v. through diodes 53 and 54 so as to maintain the swing of the $D_{2/3}$ signal between these limits. This $D_{2/3}$ output signal is then fed directly into the carry diode network provided for the next stage.

This arrangement of the carry diode networks results in a fast propagation of all the interstage carries since each carry network responds to signal obtained directly from the carry driver tube output of the previous stage and from the tubes of the flip-flop circuits of the present stage. This arrangement reduces transient effects to a minimum and ensures that the carry diode networks for all the stages settle fast enough, in response to their inputs, so that the outputs therefrom can be fed into the trigger input networks causing them in turn to settle such that their outputs can rise in time to gate clock pulses to the inputs of the A flip-flop circuits which must be triggered to set up the binary sum.

It should be understood that because of inherent capacitance in diode networks of this type, the leading edges of the output signals therefrom rise with an appreciable time constant. The driver tubes which interconnect the stage carry networks are operated so that their output signals are generated in response to less than the rise time of the diode network output, thus speeding up the propagation of the carry information which must occur in succession from the first to last stages of the accumulator.

It should be noted that this method of generating the carry information provides for all the intermediate stage carry networks being identical in that resistors of the same value are employed for all the logical circuits. This arrangement enables stages to be added to the accumulator to increase its capacity by merely interconnecting circuitry of the same nature.

The formulation of the logical equations for generating "no carry" information from the even to the odd stages will be described by reference to Table I in Fig. 5. Each row of the table represents the binary information which must exist during a basic timing period, i.e., a clock period, at the inputs of the carry networks of the second stage of the accumulator, the A2 flip-flop, in order to determine the carry information to be immediately propagated into the following stage, i.e., the third stage of the accumulator. This table also furnishes information as to whether the second stage flip-flop of the accumulator must be triggered at the end of the clock period in order to set up the new sum.

When, as a result of adding each row of inputs in the table, according to the binary number system, a "no carry" is obtained, the $D'_{2/3}$ column of the row has a binary digit "one" placed therein. Thus note that the inputs for the first, second, third, and fifth rows of the table result in a "no carry" signal. The overall "no carry" logical equation in this case is obtained by logically summing the logical products of the input conditions existing in each of these rows. Accordingly:

$$D'_{2/3}=A'_2B'_2D'_{1/2}+A'_2B'_2D_{1/2}+A'_2B_2D'_{1/2}+A_2B'_2D'_{1/2}$$

By the rules of Boolean algebra, it can be shown that this equation may be reduced to:

$$D'_{2/3}=A'_2D'_{1/2}+B'_2D'_{1/2}+A'_2B'_2$$

The "carry" information for the even stages can be similarly determined by use of table II in Fig. 6. For this case, the logical equation for $D_{3/4}$ can be shown to be equal to $D_{3/4}=A_3D_{2/3}+B_3D_{2/3}+A_3B_3$ By inspection of these equations and further, noting the circuitry for generating them in Fig. 3, it should be clear that this system of generating the carry information enables each of the carry diode networks to respond to only the signal generated by the carry (or no-carry) driver of the previous stage, and never to the signal generated by the carry diode network for the previous stage.

The trigger circuits for controlling the flip-flop circuits of the accumulator will next be described in connection with Fig. 4.

Note that, except for the first stage trigger circuit which does not of course respond to any carry information, the trigger circuit for any of the other stages responds to both "carry" and "no carry" information generated by the carry logical circuitry of the previous stage. The inputs to the diodes in the logical circuitry for generating the trigger signals $a_2$ and ${}_0a_2$, controlling the A2 flip-flop, include signals $D_{1/2}$ and $D'_{1/2}$. Likewise the inputs to the diodes in the $a_3$ and ${}_0a_3$ circuitry include signals $D_{2/3}$ and $D'_{2/3}$. Thus it is to be noted (Fig. 3) that these latter terms, $D_{2/3}$ and $D'_{2/3}$, are not taken directly from the flip-flop circuits but rather are generated almost instantaneously during the current basic timing period, as a function of the first stage carry information, $D'_{1/2}$, which latter information was also generated during the current basic timing period. Thus the need for providing circuitry which will derive the interstage carry information quickly should be clearly understood.

Furthermore it should be noted in Fig. 4 that, except for the circuitry provided for generating the trigger equations for the first stage, the trigger circuitry for the remaining stages are all identical. Thus the arrangement of the circuitry and the resistor values for generating the $a_2$ and ${}_0a_2$ trigger equations are identical to those for generating the remaining trigger equations.

Referring to Fig. 5, the explanation of the arrangement of the trigger logical equations for the A flip-flops will be made clear. These equations function to set-up the resulting sum of the binary numbers in the A flip-flops. Thus, for example, the logical equations $a_2$ and ${}_0a_2$ for the flip-flop A2 are obtained by comparing the "A2" column with the "sum" column of Table I. If the sum digit is the same as the previous digit in the A2 flip-flop, then neither $a_2$ nor ${}_0a_2$ is made effective. If, however, the A2 flip-flop is to change from a 0 to a 1 digit, the $a_2$ column has a 1 inserted therein, while if the A2 flip-flop is to change from a 1 to a 0 digit, the ${}_0a_2$ column has a 1 inserted therein. Thus note that the sum digit stored in the A2 flip-flop changes from a 0 to 1 for the input conditions presented by the second and third rows of Table I. Thus:

$$a_2=(A'_2B'_2D_{1/2}+A'_2B_2D'_{1/2})C$$

This equation reduces to $a_2=A'_2(B'_2D_{1/2}+B_2D'_{1/2})C$.

Similarly the sum digit in the A2 flip-flop changes from a 1 to a 0 for the input conditions presented by the sixth and seventh rows of the Table I. Thus:

$${}_0a_2=(A_2B'_2D_{1/2}+A_2B_2D'_{1/2})C$$

which reduces to ${}_0a_2=A_2(B'_2D_{1/2}+B_2D'_{1/2})C$.

The logical equations for setting up the resulting sum in the odd stages of the accumulator, such as flip-flop A3, are obtained in an identical manner by reference to Table II in Fig. 6, and will not be further described.

Thus note that the trigger equations for both the odd and even stages of the accumulator include both the "carry" and "no carry" signals from the previous stage. This points out the need for generating both the "carry" and "no carry" information from each stage, the one by a logical network and the other by a driver.

Referring next to Fig. 7, the operation of the circuitry will be further clarified by describing the waveforms at various points of the circuitry associated with the second stage flip-flop A2 of the accumulator during each clock period. As shown in line I of the time chart, the clock pulses C are seen to be periodic square wave pulses having approximately a 120 kc. rate, the basic timing period being defined as occurring from the trailing edge of one square wave to the next. During the clock period designated by reference numeral 60, the A1 flip-flop is assumed to be storing a digit one, while the corresponding stage, B1, in the incoming register 28 is assumed to be storing a digit zero (waveforms not shown). As a result of these conditions the carry diode network $D_{1/2}$ generates a low voltage signal, as shown on line II. Simultaneously, the driver $T_{1/2}$ generates $D'_{1/2}$ as a high voltage signal, as shown on line III, indicative of a "no carry" signal into the second stage of the accumulator. During this same clock period the A2 flip-flop is considered to be storing a digit "one," as indicated by the waveform on line IV, while the corresponding stage B2 of the incoming register 28 is also storing a digit one, as indicated by the waveform on line V. With these existing conditions, the "no carry" signal $D'_{1/2}$ into the second stage immediately combines with the information in this stage to propagate the carry information into the third stage. Thus the $D'_{1/2}$ term is fed into the $D'_{2/3}$ diode network which also responds to the conditions of the A2 and B2 flip-flops to generate a low $D'_{2/3}$ output signal, line VI, which, when inverted in driver $T_{2/3}$ generates a high voltage signal $D_{2/3}$, as indicated on line VII. Note that this latter carry information is generated almost instantaneously since the carry diode network responds immediately to the flip-flop outputs and the drivers. This propagation of the carry information then continues on throughout the circuitry since it must be completed well within the first half of the clock period 60.

As a result of the $A_2$ output, the $B_2$ output and the $D'_{1/2}$ output being simultaneously of a high potential, the ${}_0a_2$ trigger equation is effective, as shown on line VIII, to pass a clock pulse C to the left input of the A2 flip-flip circuit. This gated clock pulse is differentiated and clipped so that the negative pulse, shown in line IX, triggers the A2 flip-flop into a false state. This occurs at the end of clock period 60. Simultaneously with this change, any changes in the states of the remainder of the A flip-flops in the accumulator 25, as well as the B flip-flops in the incoming register 28, are made. Thus, starting immediately at the beginning of the next clock period 61, the carry diode network for each stage resettles to its new state dependent on the new states of the A and B flip-flops and the carry into the stage resulting from settling of all lower order stage carry diode networks. The output of carry diode network $D_{1/2}$, as a result of the new conditions of the contents of the A1 and B1 flip-flops during clock period 61, is assumed to now swing to a high voltage, indicative of a "carry" signal into the second stage circuits, while the output $D'_{1/2}$ of driver $T_{1/2}$ swings to a low voltage. As a result of this, the $D'_{2/3}$ diode network, in turn, responds to the new conditions of the A2 and B2 flip-flops and the $D'_{1/2}$ driver output such that the $D'_{2/3}$ diode network output sends a high voltage signal indicative of a "no carry" signal to the third stage.

Simultaneously the $a_2$ trigger equation diode network responds to the conditions of the A2 and B2 flip-flops, and the signal on carry output $D_{1/2}$ to pass the clock pulse (line X) which is differentiated and clipped such that the negative pulse created (line XI) is applied onto the right grid of the A2 flip-flop, thus triggering the A2 flip-flop at the end of clock period 61 into its "one" state, indicated by output $A_2$ having a high voltage level thereon.

It should be understood that because of the inherent delays in propagating the carry information toward the final stage of the accumulator, there is a limit to the number of stages which can be added while maintaining the basic timing period. However, it has been determined that accumulators designed in accordance with the principles set forth herein can be successfully operated at a 120 kc. rate with as many as 24 binary stages.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages, and the invention is therefore claimed in embodiments of various forms all coming within the scope of the claims which follow:

What is claimed is:

1. An accumulator circuit comprising a first means for storing a binary number; a second means for receiving an incoming binary number; a first two-state logical circuit responsive to the binary numbers in said first and second means to simultaneously propagate and set-up interstage carry digits from the first to last denominational orders of said numbers; and a second two-state logical circuit responsive to binary numbers in said first and second means and the carry digits set-up in said first two-state logical circuit to set-up the sum of said numbers in said first means.

2. A circuit of the class described including a storage means comprised of a series of bistable state circuits corresponding to binary stages; a source of periodic timing signals; input means corresponding to binary stages for sensing signals representing digits of an incoming binary number; a first circuit means responsive to said bistable state circuits and said input means to simultaneously propagate and set-up carry signals from the first to last stages of said storage means; and a second circuit means responsive to said bistable state circuits, said input means, said first circuit means, and said timing source for generating signals to trigger said bistable state circuits, whereby said incoming number is added to the contents of said storage means on receipt of each timing signal from said source.

3. A circuit of the class described comprising a series of bistable state circuits for storing a number, each of said circuits having a pair of output lines whose signals indicate the state of the respective circuit, and each of said circuits having a pair of trigger inputs; a source of recurring square wave timing pulses whose periods correspond to the duration of signal manifestations representing binary digits; a plurality of pairs of input lines for signals indicative of binary digits of an incoming number; means responsive to the output line signals of the bistable state circuits and to the input signals on said input lines and to signals generated within the means, for providing carry signals; two-state logical networks arranged to be conditioned by said carry signals and by signals on said input lines and the signals on the output lines of said bistable state circuits for simultaneously generating signals capable of gating a timing pulse during each timing pulse period onto the trigger inputs of said bistable state circuits; and means included in said inputs to enable said bistable state circuits to be triggered by said timing pulses only at the ends of the timing periods.

4. An accumulator circuit comprising a plurality of flip-flop circuits for storing a binary number, each of said circuits having a pair of triggering input connections thereto and a pair of output terminals providing signals indicating binary digits of the number; a source of recurring square wave pulses whose period from the trailing edge of one square wave to the next defines a basic operating period; a plurality of pairs of input lines having signals thereon synchronized with the period of said square wave pulses for indicating binary digits of an incoming number; a first circuit means having a pair of output lines for each stage of the binary numbers, said first circuit means responsive to the signals on said input lines and the signals on the output terminals of said flip-flop circuits to generate interstage carry signals on said output lines during the first portion of each basic operating period; a second circuit means responsive during each basic operating period to the signals on said input lines, the signals on the output terminals of said flip-flop circuits, and the interstage carry signals generated by said first circuit means for generating control signals for gating the square wave present during the last portion of the basic operating period onto the trigger input connections of said flip-flop circuits; and differentiating circuit means in each of said tripper input connections for generating a sharp pulse capable of triggering said flip-flop circuit at the end of a square wave pulse applied thereto.

5. An accumulator circuit comprising a series of bistable state circuits for storing a binary number, each of said circuits having a pair of output lines with signals thereon indicative of its states and a pair of trigger inputs; a source of timing pulses having a period corresponding to the duration of signal manifestations corresponding to binary digits; a plurality of pairs of input lines having signals thereon synchronized with the period of said timing pulses for indicating binary digits of an incoming number; a first circuit means having a pair of output lines for each stage of said numbers, said first circuit means conditioned by corresponding signals on said input lines and the signals on the output lines of said bistable state circuits for setting up interstage "carry" and "no carry" signals on the respective outputs thereof; and a second circuit means conditioned by signals on said input lines, the signals on the output lines of said bistable state circuits, the interstage "carry" and "no carry" signals set up on the outputs of said first circuit means and said timing signals for generating signals to be applied on the inputs of said bistable state circuits, whereby the binary number indicated on the input lines during each timing signal period is added to the binary number set up in said bistable state circuits at the end of each timing signal period.

6. A circuitry of the class described comprising a source of periodic timing pulses; a first series of flip-flop circuits for storing a binary number; a second series of flip-flop circuits for storing a binary number; a plurality of interstage carry driver circuits; a first set of diode networks each responding to the contents of corresponding even stages of said numbers and a "no carry" signal generated by the interstage carry driver from the previous stage for generating a "no carry" signal to the following stage; a second set of diode networks responding to the contents of corresponding odd stages of said numbers and a "carry" signal generated by the interstage carry driver from the previous stage for generating a "carry" signal to the following stage; other diode networks for corresponding stages of said numbers responding to both the "carry" and "no carry" signals of the previous stage, the contents of said corresponding stages, and said timing pulses, to generate trigger signals; and means responsive to said trigger signals for triggering the first series of flip-flop circuits at the end of the periods of said timing pulses, whereby the number content stored in said second series of flip-flop circuits is added to the contents stored in said first series of flip-flop circuits.

7. A circuitry of the class described comprising a source of periodic timing pulses; a first series of flip-flop circuit stages for storing a binary number; a second series of flip-flop circuit stages for storing a binary number; an interstage carry driver circuit associated with the second series of flip-flop circuit stages; a first set of diode networks associated with alternate stages of said series, each responding to the binary "zero" states of corresponding stages of said series and a "no carry" signal generated by the interstage carry driver associated with the previous stage for generating a "no carry" signal which is fed to the interstage carry driver associated with the stage; a second set of diode networks associated with the remaining stages of said series, each responding to the binary "one" states of corresponding stages of said series and a "carry" signal generated by the interstage carry driver associated with the previous stage for generating a "carry" signal which is fed to the interstage carry driver circuit associated with the stage; other diode networks responding to corresponding stages, both the "carry" and "no carry" signals from the previous stage, and said timing pulses, to generate trigger signals; and means responsive to said trigger signals for simultaneously triggering the second series of flip-flop circuits to set up the sum therein at the end of the periods of said timing pulses.

8. A circuit of the class described comprising a plurality of bistable state circuits for storing a binary number, each said circuit having a pair of trigger input connections thereto and a pair of output lines having signals thereon for indicating the binary digit stored therein; a source of periodic timing signals; a plurality of pairs of input lines, each said pair of input lines having signals thereon synchronized with the period of said timing signals for indicating binary digits of an incoming number; a first circuit means comprising a diode network for each stage of the numbers, each said diode network arranged to respond to signals on corresponding output lines of a bistable state circuit and a pair of input lines and to an inverted form of the output signal generated by the diode network for the previous stage, to thereby produce signals in said first circuit means representing the interstage carry digits before an addition is made; and a second circuit means comprising a diode network for each trigger input connection to a bistable state circuit, each said latter diode networks arranged to respond to signals on the output lines of a bistable state circuit and a pair of input lines, and the interstage carry signals produced by said first circuit means to gate timing signals onto the trigger input connections of the bistable state circuits to set up therein a number representing the sum of the binary number on said input lines and the binary number previously stored in the bistable state circuits.

9. A computer circuit for parallel accumulation in a plurality of binary storage means arranged in stages and each representative of a respective order of a plural-digit binary number, the sum of a binary quantity presently stored in said storage means, and a second binary quantity represented by binary signals contemporaneously presented on respective input means arranged in stages and each of which is assigned a respective order of a binary number, computer means including: such storage means and such input means; means including bi-level signal networks functionally disposed in stages and each functionally interposed between two stages of said storage means and between two stages of said input means and connected to each thereof, said networks being serially interconnected from the lowest order to the highest and arranged to sense all the digits of both the digital quantity stored in the stages of said storage means and the digital quantity presented on the several stages of said input means and contemporaneously therewith produce and propagate through said networks carry and no-carry signals for each of the respective stages of said storage means; and means including bi-level signal networks, one for each storage stage and connected to a respective stage of said input means, to a respective one of said storage means, and to a respective one of said bi-level signal networks and effective to alter the binary quantity stored in said storage means to produce in said storage means the sum of said first named binary quantities.

References Cited in the file of this patent

UNITED STATES PATENTS

| | | |
|---|---|---|
| 2,700,504 | Thomas | Jan. 25, 1955 |
| 2,719,670 | Jacobs et al. | Oct. 4, 1955 |
| 2,808,204 | Geyer et al. | Oct. 1, 1957 |

OTHER REFERENCES

Electronic Engineering, December 1950, pages 492–498, "An Electronic Digital Computor," by Booth. 250–27CC Lit.